(12) United States Patent
Dai et al.

(10) Patent No.: US 11,366,819 B2
(45) Date of Patent: Jun. 21, 2022

(54) METHOD, APPARATUS, ELECTRONIC DEVICE AND COMPUTER READABLE MEDIUM FOR OBTAINING ANSWER TO QUESTION

(71) Applicant: Beijing Baidu Netcom Science and Technology Co., Ltd., Beijing (CN)

(72) Inventors: Songtai Dai, Beijing (CN); Xinwei Feng, Beijing (CN); Miao Yu, Beijing (CN); Huanyu Zhou, Beijing (CN); Xunchao Song, Beijing (CN); Pengcheng Yuan, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 209 days.

(21) Appl. No.: 16/812,062

(22) Filed: Mar. 6, 2020

(65) Prior Publication Data

US 2021/0011921 A1   Jan. 14, 2021

(30) Foreign Application Priority Data

Jul. 9, 2019  (CN) .......................... 201910616050.5

(51) Int. Cl.
*G06F 16/2457* (2019.01)
*G06N 20/00* (2019.01)
*G09B 7/02* (2006.01)

(52) U.S. Cl.
CPC ....... *G06F 16/24578* (2019.01); *G06N 20/00* (2019.01); *G09B 7/02* (2013.01)

(58) Field of Classification Search
CPC ........... G06F 16/24578; G06F 16/2457; G06F 16/93; G06N 20/00; G06N 3/08; G09B 7/02

See application file for complete search history.

(56) References Cited

U.S. PATENT DOCUMENTS 9,940,367 B1 * 4/2018 Baker ................. G06F 16/9535
2009/0287678 A1   11/2009 Brown et al.
(Continued)

FOREIGN PATENT DOCUMENTS

CN   101872349 A   10/2010
CN   109189894 A   1/2019
(Continued)

OTHER PUBLICATIONS

Kupiec, "MURAX: A Robust Linguistic Approach for Question Answering Using an On-Line Encyclopedia", 10 pages (Jun. 2001).

*Primary Examiner* — Hau H Hoang
(74) *Attorney, Agent, or Firm* — Knobbe, Martens, Olson & Bear LLP

(57) ABSTRACT

A method for obtaining an answer to a question is provided. The method may include: acquiring a question; determining at least a part of articles in a preset article database as candidate articles, and determining first scores of the candidate articles respectively, the first score of any of the candidate articles representing a matching degree between the candidate article and the question; determining at least a part of texts in each of the candidate articles as candidate texts, and determining second scores of the candidate texts respectively, the second score of any of the candidate texts representing a matching degree between the candidate text and the question; and determining at least a part of the candidate texts as the answer based on a score set of each of the candidate texts, the score set of any of the candidate texts including the second score and the first score.

7 Claims, 4 Drawing Sheets

(56) References Cited

U.S. PATENT DOCUMENTS

2012/0078891 A1    3/2012  Brown et al.
2017/0364519 A1   12/2017  Beller et al.
2020/0242142 A1*   7/2020  Connell, II ........... G06F 40/284

FOREIGN PATENT DOCUMENTS

| CN | 109284357 A    | 1/2019  |
| CN | 109635094      | 4/2019  |
| JP | 2004133771 A   | 4/2004  |
| JP | 2005038088 A   | 2/2005  |
| WO | 2009/143395 A1 | 11/2009 |

* cited by examiner

METHOD, APPARATUS, ELECTRONIC DEVICE AND COMPUTER READABLE MEDIUM FOR OBTAINING ANSWER TO QUESTION

CROSS-REFERENCE TO RELATED APPLICATIONS

This application claims priority to Chinese Patent Application No. 201910616050.5, filed on Jul. 9, 2019, titled "Method, Apparatus, Electronic Device and Computer Readable Medium for Obtaining Answer to Question," which is hereby incorporated by reference in its entirety.

TECHNICAL FIELD

Embodiments of the present disclosure relate to the field of database technology, and particularly to a method, apparatus, electronic device, and computer readable medium for obtaining an answer to a question.

BACKGROUND

General answer mining is a technology in the field of natural language understanding and machine question answering, and specifically includes selecting a part of texts in a part of articles from an article database including a plurality of articles as answers based on a question, to achieve answering the question. Therefore, general answer mining is essentially equivalent to a process of obtaining an answer to a question.

However, the existing general answer mining technology has low recall, i.e., a correct text that should be used as an answer is likely to be pre-screened, such that the correct text can not be provided as the answer.

SUMMARY

Embodiments of the present disclosure provide a method, apparatus, electronic device, and computer readable medium for obtaining an answer to a question.

In a first aspect, a method for obtaining an answer to a question is provided. The method includes: acquiring a question; determining at least a part of articles in a preset article database as candidate articles, and determining first scores of the candidate articles respectively, the first score of any of the candidate articles representing a matching degree between the candidate article and the question; determining at least a part of texts in each of the candidate articles as candidate texts, and determining second scores of the candidate texts respectively, the second score of any of the candidate texts representing a matching degree between the candidate text and the question; and determining at least a part of the candidate texts as the answer based on a score set of each of the candidate texts, the score set of any of the candidate texts including the second score of the candidate text and the first score of the candidate article to which the candidate text belongs.

In some embodiments, after the acquiring a question and before the determining at least a part of the candidate texts as the answer, the method further includes: determining a third score of the question, the third score being a score representing a type to which the question belongs; and the score set of any of the candidate texts further includes: the third score of the question.

In some embodiments, after the determining at least a part of texts in each of the candidate articles as candidate texts and before the determining at least a part of the candidate texts as the answer, the method further includes: determining at least one fourth score of each of candidate combinations respectively, any of the candidate combinations being a combination composed of the candidate text, the article of the candidate text, and the question, each of the fourth scores representing a score of verifying a matching degree of between elements in a candidate combination in accordance with a preset checking rule; and the score set of any of the candidate texts further includes: all fourth scores of the candidate combination of the candidate text.

In some embodiments, the determining at least a part of the candidate texts as the answer based on a score set of each of the candidate texts includes: determining at least a part of the candidate texts as the answer using a preset machine learning model based on the score set of each of the candidate texts.

In a second aspect, an apparatus for obtaining an answer to a question is provided. The apparatus includes: a question acquiring module configured to acquire a question; a first scoring module configured to determine at least a part of articles in a preset article database as candidate articles, and determine first scores of the candidate articles respectively, the first score of any of the candidate articles representing a matching degree between the candidate article and the question; a second scoring module configured to determine at least a part of texts in each of the candidate articles as candidate texts, and determine second scores of the candidate texts respectively, the second score of any of the candidate texts representing a matching degree between the candidate text and the question; and an answer determining module configured to determine at least a part of the candidate texts as the answer based on a score set of each of the candidate texts, the score set of any of the candidate texts including the second score of the candidate text and the first score of the candidate article to which the candidate text belongs.

In some embodiments, the apparatus further includes: a third scoring module configured to determine a third score of the question, the third score being a score representing a type to which the question belongs; and the score set of any of the candidate texts further includes: the third score of the question.

In some embodiments, the apparatus further includes: a fourth scoring module configured to determine at least one fourth score of each of candidate combinations respectively, any of the candidate combinations being a combination composed of the candidate text, the article of the candidate text, and the question, each of the fourth scores representing a score of verifying a matching degree between elements in a candidate combination in accordance with a preset checking rule; and the score set of any of the candidate texts further includes: all fourth scores of the candidate combination of the candidate text.

In some embodiments, the answer determining module is configured to: determine at least a part of the candidate texts as the answer using a preset machine learning model based on the score set of each of the candidate texts.

In a third aspect, an electronic device is provided. The electronic device includes one or more processors; and a storage apparatus, storing one or more programs thereon, where the one or more programs, when executed by the one or more processors, cause the one or more processors to implement the method for obtaining an answer to a question according to any of above embodiments.

In a fourth aspect, computer readable medium is provided. The computer readable medium stores a computer program, which when executed by a processor, implement the method for obtaining an answer to a question according to any of above embodiments.

Some embodiments of the present disclosure obtain a plurality of different scores for candidate texts (possible answers) respectively, and comprehensively select answers from the candidate texts based on these scores, where different scores evaluate a possibility of a candidate text being an answer from different aspects, thereby accurately obtaining a most reasonable answer based on the plurality of scores. On the one hand, a correct candidate text that should be used as an answer is not directly filtered because of a low individual score, to guarantee that the correct candidate text has a great probability of being finally selected as the answer, and the recall of the answer is high; on the other hand, an incorrect candidate text that should not be used as an answer is not finally selected as the answer even if a score is high due to other low scores, thereby ensuring a high correctness rate of the answers.

BRIEF DESCRIPTION OF THE DRAWINGS

The accompanying drawings are used for providing further understanding of embodiments of the present disclosure, constitute an integral part of the specification, and are used for interpreting the present disclosure together with the embodiments of the present disclosure, but do not impose any limitation on the present disclosure. By describing detailed example embodiments with reference to the accompanying drawings, the above and other features and advantages of the present disclosure will become more apparent for those skilled in the art. In the drawings.

DETAILED DESCRIPTION OF EMBODIMENTS

Figure 1:
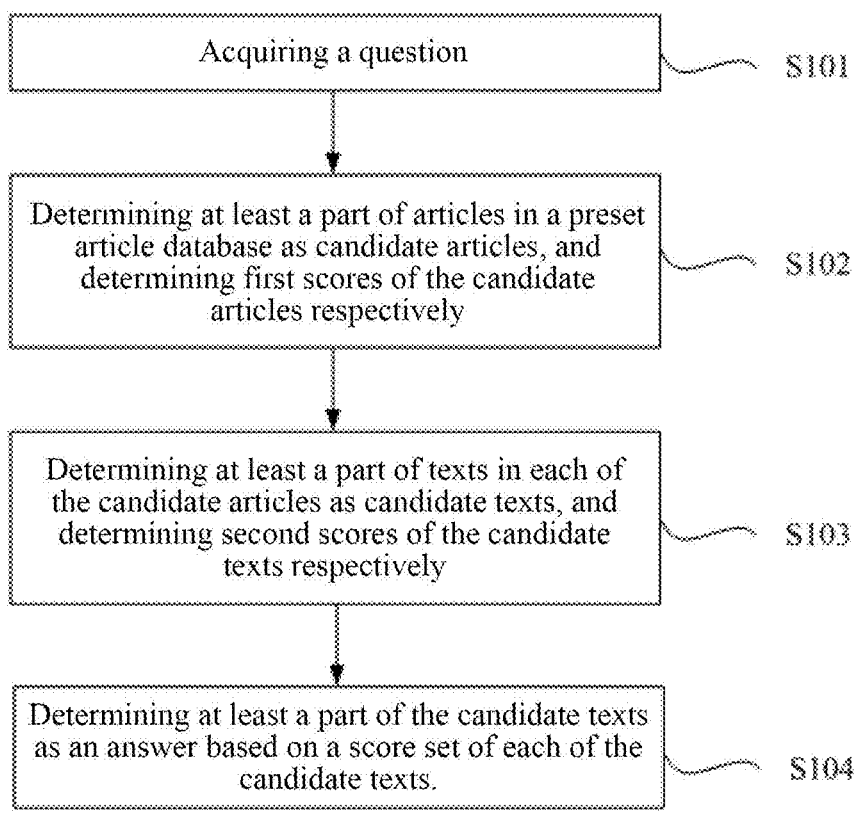
FIG. 1 is a flowchart of a method for obtaining an answer to a question provided by an embodiment of the present disclosure.

To make those skilled in the art better understand the technical solutions of the present disclosure, the method, apparatus, electronic device, and computer readable medium for obtaining an answer to a question provided by embodiments of the present disclosure will be described in detail below in conjunction with the accompanying drawings.

While example embodiments will be described more fully hereinafter with reference to the accompanying drawings, the example embodiments may be embodied in different forms and should not be construed as being limited to the present disclosure. On the contrary, these embodiments are provided to make the present disclosure thorough and complete and enable those skilled in the art to understand scope of the present disclosure.

As used herein, the term "and/or" includes any one and all combinations of one or more of associated listed items.

As used herein, the terms are intended merely to describe particular embodiments, and are not intended to limit the present disclosure. As used herein, the singular forms "a," "an," and "the" are intended to include the plural forms as well, unless the context expressly indicates otherwise.

The terms "comprises" and/or "composed of," when used in the present disclosure, specify the presence of stated features, integers, steps, operations, elements, and/or components, but do not preclude the presence or addition of one or more other features, integers, steps, operations, elements, components, and/or groups thereof.

Embodiments described herein may be described with reference to plan views and/or cross-sectional views by way of ideal schematic views herein. Accordingly, the example views may be modified depending on manufacturing technologies and/or tolerances.

Embodiments of the present disclosure are not limited to those shown in the views, but include modifications in configuration formed on the basis of manufacturing processes. Therefore, regions shown in the drawings have schematic properties and shapes of the regions shown in the drawings are examples of specific shapes of regions of elements and are not intended to be limiting.

Unless otherwise defined, all terms (including technological and scientific terms) used herein have the same meanings as commonly understood by those of ordinary skills in the art. It will be further understood that, terms, such as those defined in commonly used dictionaries, should be interpreted as having meanings that are consistent with their meanings in the context of the relevant art and the present disclosure, and will not be interpreted as having meaning in an idealized or excessive form unless expressly so defined herein.

Embodiments of the present disclosure are used to implement general answer mining. Specifically, for determining a question, in some embodiments of the present disclosure, a part of texts in a part of articles can be selected from a preset article database (article library), as answers to the question, i.e., obtaining the answers to the question.

FIG. 1 is a flowchart of a method for obtaining an answer to a question provided by an embodiment of the present disclosure.

Figure 3:
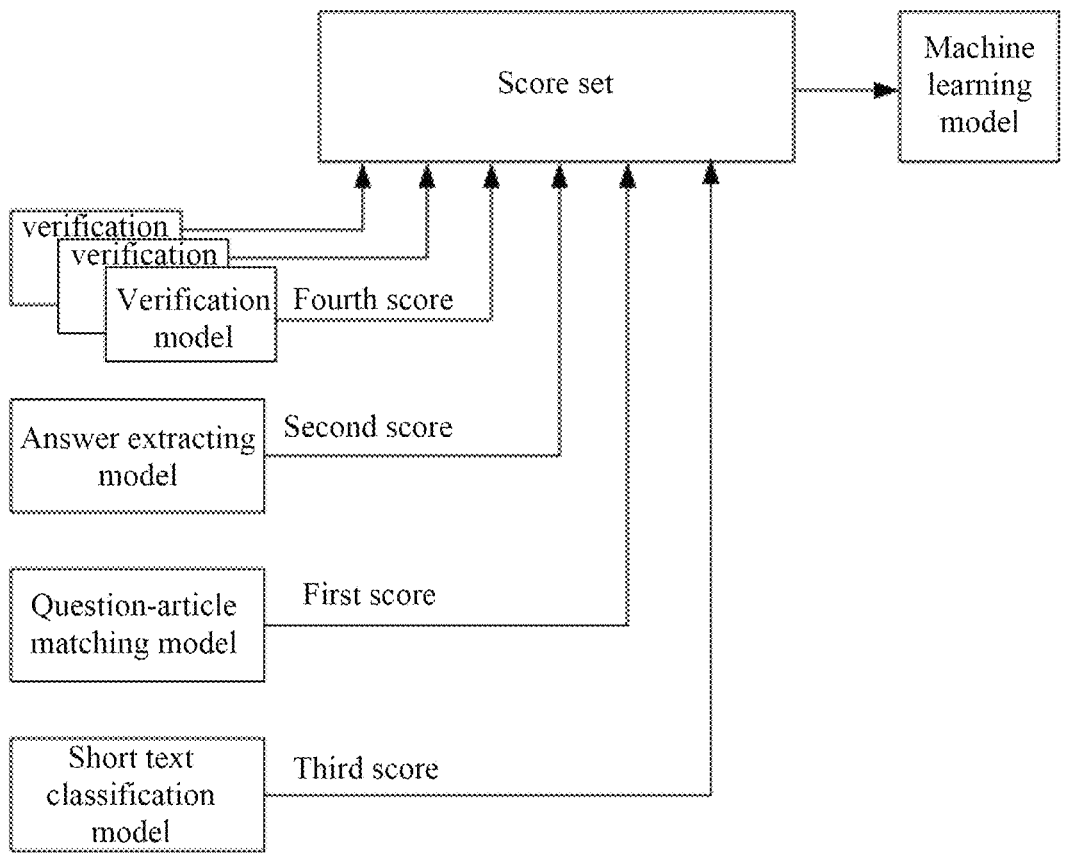
FIG. 3 is a logical process diagram of still another method for obtaining an answer to a question provided by an embodiment of the present disclosure.

In a first aspect, referring to FIG. 1 and FIG. 3, some embodiments of the present disclosure provide a method for obtaining an answer to a question, including:

S101: acquiring a question.

A to-be-answered question is acquired, to find an answer corresponding to the to-be-answered question.

The question may be acquired in various specific ways. For example, a text inputted by a user may be acquired as the question, or a voice inputted by the user may be converted into a text question, or the question may be acquired from a preset question library.

The question may also be in various specific forms. For example, the question may be an interrogative sentence, such as "How long is the diameter of the earth;" for another example, the question may alternatively be in a form similar to a keyword for search, such as "the diameter of the earth."

It should be understood that in actual operations, a plurality of questions may be acquired at a time, and then an answer to each question is acquired respectively in accordance with subsequent steps. However, for clearness, the subsequent descriptions are performed for a question as an example.

S102: determining at least a part of articles in a preset article database as candidate articles, and determining first scores of the candidate articles respectively, the first score of any of the candidate articles representing a matching degree between the candidate article and the question.

The article database (article library) is a preset database including a plurality of articles. Each article further includes a plurality of texts.

The article database may be in various forms. For example, the article database may be a structured database composed of data in a particular format, or may be a distributed database composed of all data within a search range of a particular search engine.

Each article may be in the form of a web page, a document, data, and so on. Generally speaking, each article should have different parts, such as a title, a subtitle, and a body text, and all contents therein should be related to a same topic.

Obviously, the articles in the database are not necessarily related to the question, i.e., a part of the articles cannot provide answers to the questions at all. Therefore, in this step, it is necessary to select a part of articles that may include answers from the article database using a deterministic algorithm, for use as the candidate articles, and determine a first score for each candidate article based on the matching degree between each candidate article and the question (or a possibility that the article contains an answer to the question).

The candidate articles and the first scores are determined in various specific ways. For example, a part of articles related to the question may be obtained by search from the article database as the candidate articles, and then the first scores of these candidate articles are calculated; or, the first scores of all articles in the article database may be calculated, and then articles with scores exceeding a threshold or a preset number (top 10) of articles with top-ranked scores are selected as the candidate articles. As another example, the first scores may be calculated by a preset question-article matching model; or, the first scores may be calculated by a preset equation.

According to the method of some embodiments of the present disclosure, a large number of candidate articles may be selected here, to ensure that articles that have a possibility (even if the possibility is low) to contain answers are all selected as the candidate articles, thereby improving the recall of answers.

S103: determining at least a part of texts in each of the candidate articles as candidate texts, and determining second scores of the candidate texts respectively, the second score of any of the candidate texts representing a matching degree between the candidate text and the question.

Obviously, it is impossible that texts in the above candidate articles are all answers to the question, and only a part of the texts may be answers. Therefore, after obtaining the candidate articles, a plurality of texts (there may be no candidate text, one candidate text, or a plurality of candidate texts in each candidate article) may be selected from the candidate articles, for use as the candidate texts that may be the answers.

The candidate texts and the second scores are determined in various specific ways. For example, a part of texts may be selected from the candidate articles using a preset algorithm (e.g., an answer extracting model), and then the second scores of these candidate texts are calculated; or, the second scores of all texts in all candidate articles may be calculated, and then texts with scores exceeding a threshold or a preset number of texts with top-ranked scores are selected as the candidate texts. For another example, the second scores may be calculated by a preset answer extracting model; or, the second scores may be calculated by a preset equation.

S104: determining at least a part of the candidate texts as an answer based on a score set of each of the candidate texts, the score set of any of the candidate texts including the second score of the candidate text and a first score of a candidate article to which the candidate text belongs.

According to the above steps, a score set corresponding to each candidate text is obtained. The score set includes a plurality of scores related to the candidate text. The specific score at least includes the second score of the candidate text and the first score of the candidate article corresponding to the candidate text (i.e., an article from which the candidate text is sourced) belongs.

In this step, a possibility of using each candidate text as the answer is determined comprehensively based on the plurality of scores in the score set of each candidate text, to determine a part of the candidate texts as the answer for answering the question, and complete the process of obtaining the answer to the question.

The "determining at least a part of the candidate texts as an answer based on a score set of each of the candidate texts" in this step means that in the process of determining the answer, it is necessary to comprehensively use all scores in the score set, i.e., the scores in the score set need to have an association, to determine the answers based on an association result. Therefore, the method of some embodiments of the present disclosure can not perform the determination independently by each score respectively, for example, can not set a threshold for each score respectively and use all candidate texts with scores satisfying the corresponding thresholds respectively as the answers. In addition, the method of some embodiments of the present disclosure should use each score in the score set, i.e., cannot have a score that does not play a role in the determining process.

In some embodiments, this step specifically includes: determining at least a part of the candidate texts as an answer using a preset machine learning model based on the score set of the candidate texts.

That is, the plurality of scores in the score set may be processed based on the preset machine learning model, thereby determining which candidate texts may be used as the answers, where the machine learning model may be in various forms, e.g., a gradient boosting decision tree (GBDT) model.

It should be understood that the machine learning model may be obtained by training, i.e., the candidate texts and the score set for training may be inputted into the machine learning model respectively, answers outputted by the machine learning model are compared with a predetermined standard answer, and parameters of the machine learning model are adjusted based on a comparison result, such that the machine learning model is increasingly complete.

The answers may be determined in various specific ways. For example, the answers may be determined using the above machine learning model; or a total comprehensive score may be obtained by calculating using the plurality of scores in the score set through a preset equation, and candidate texts with corresponding comprehensive scores exceeding the threshold or a preset number of candidate texts with top-ranked scores are used as the answers.

Some embodiments of the present disclosure obtain a plurality of different scores for candidate texts (possible answers) respectively, and comprehensively select an answer from the candidate texts based on these scores, where different scores are used to evaluate a possibility of a candidate text being an answer from different aspects, thereby accurately obtaining a most reasonable answer based on the plurality of scores. On the one hand, a correct candidate text that should be used as an answer is not directly filtered because of a low individual score, to guarantee that the correct candidate text has a great probability of being finally selected as the answer, and the recall of the answer is high; on the other hand, even if a score is high, an incorrect candidate text that should not be used as an answer is not finally selected as the answer due to other low scores, thereby ensuring a high correctness rate of the answers.

Figure 2:
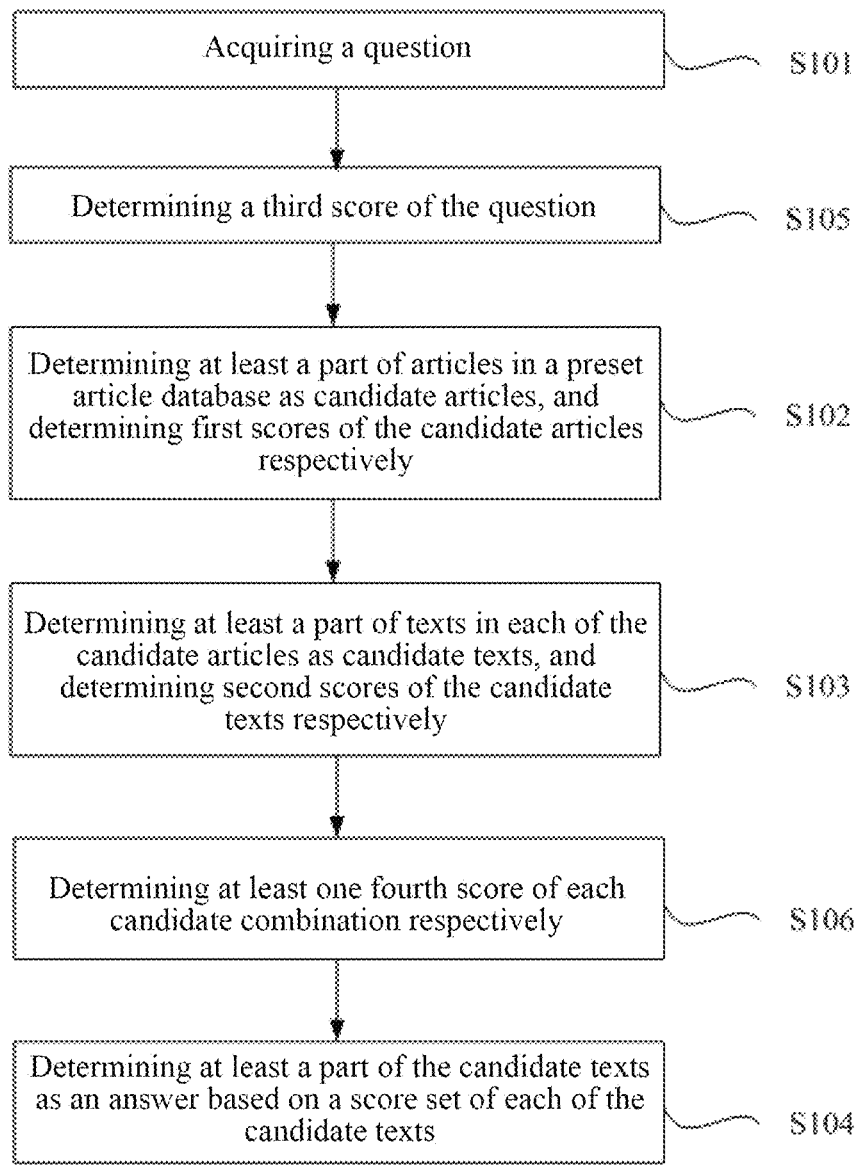
FIG. 2 is a flowchart of another method for obtaining an answer to a question provided by an embodiment of the present disclosure.

In some embodiments, referring to FIG. 2 and FIG. 3, after the acquiring a question and before the determining at least a part of the candidate texts as an answer, the method further includes:

S105: determining a third score of the question, the third score being a score representing a type to which the question belongs.

Further, the score set of any of the candidate texts further includes: the third score of the question.

After the question is obtained, the question itself may be further classified, and the third score (also a score for each candidate text) for the question is obtained based on a classification result, and the third score is used as an item in the score set of the candidate text.

Through this step, information about the question type may also be used as a reference score (third score) for determining an answer, thereby further improving the accuracy of the obtained answer.

The question may also be classified in various ways. For example, the question may be scored based on a probability of the question belonging to a "target type question," where the target type question refers to a question that can use a specific target (candidate text) in the article database as the answer, e.g., "How long is the diameter of the earth;" and a non-target question refers to a question that cannot use a specific target in the article database as the answer, e.g., "How am I looking today?". There are various ways of classifying the question, which will not be described in detail here.

The question and the third score are determined using various specific algorithms. For example, the question may be processed using a preset short text classification model to obtain the third score; or may be processed using a preset equation to obtain the third score.

This step may be performed at different times. For example, this step may be performed between the above steps S101 and S102.

In some embodiments, referring to FIG. 2 and FIG. 3, after the determining at least a part of texts in each of the candidate articles as candidate texts and before the determining at least a part of the candidate texts as an answer, the method further includes:

S106: determining at least one fourth score of each candidate combination respectively, any of the candidate combinations being a combination composed of a candidate text, an article of the candidate text, and the question, each of the fourth scores representing a score of verifying a matching degree of between elements in a candidate combination in accordance with a preset checking rule.

Further, the score set of any of the candidate texts further includes: all fourth scores of the candidate combination of the candidate text.

After the candidate texts are obtained, which is equivalent to obtaining a combination (candidate combination) composed of a candidate text, an article of the candidate text, and the question, an overall matching degree between elements in the combination may be further verified in accordance with preset checking rules (e.g., checking models). Each checking rule (e.g., each checking model) may obtain a fourth score, and each fourth score is also added to the score set of the candidate text.

Through this step, after the candidate text is obtained, the candidate text may be verified from different aspects in turn, and a verifying result may be used as a reference score (fourth score) for determining an answer, thereby further improving the accuracy of the obtained answer.

Based on different verifying rules, the candidate combination may be verified from a plurality of aspects. For example, for the question "How long is the diameter of the earth," if an article about astronomy provides description that "its diameter is 6,794 km," then the description is likely to be used as a candidate text and obtain a high first score and a high second score; but if the article is entitled "Introduction about Mars Knowledge," then it may be considered by verifying the title of the article that the diameter of 6,794 km is likely to be the diameter of Mars, rather than the diameter of the earth, thereby giving a low fourth score, to prevent the description from being selected as the answer.

Of course, the candidate combination is verified in various specific ways, which will not be described in detail here.

This step may also be performed at different times. For example, this step may be performed between the above steps S103 and S104.

Figure 4:
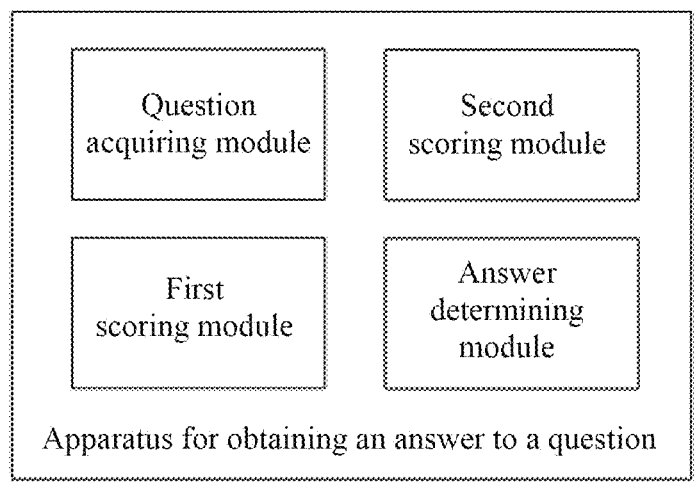
FIG. 4 is a block diagram of a structure of an apparatus for obtaining an answer to a question provided by an embodiment of the present disclosure.

FIG. 4 is a block diagram of a structure of an apparatus for obtaining an answer to a question provided by an embodiment of the present disclosure.

In a second aspect, referring to FIG. 4, some embodiments of the present disclosure provide an apparatus for obtaining an answer to a question, including:

a question acquiring module configured to acquire a question;

a first scoring module configured to determine at least a part of articles in a preset article database as candidate articles, and determine first scores of the candidate articles respectively, the first score of any of the candidate articles representing a matching degree between the candidate article and the question;

a second scoring module configured to determine at least a part of texts in each of the candidate articles as candidate texts, and determine second scores of the candidate texts respectively, the second score of any of the candidate texts representing a matching degree between the candidate text and the question; and an answer determining module configured to determine at least a part of the candidate texts as an answer based on a score set of each of the candidate texts, the score set of any of the candidate texts including the second score of the candidate text and the first score of a candidate article to which the candidate text belongs.

Figure 5:
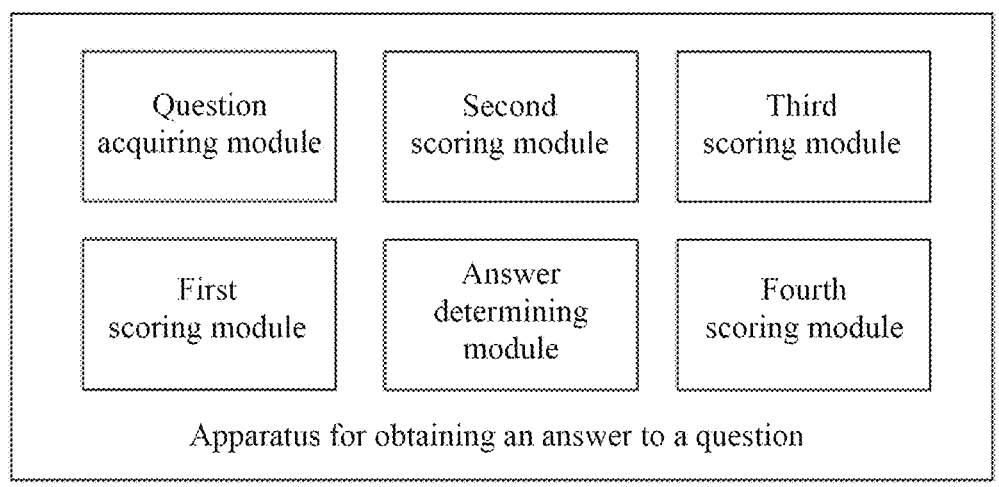
FIG. 5 is a block diagram of a structure of another apparatus for obtaining an answer to a question provided by an embodiment of the present disclosure.

In some embodiments, referring to FIG. 5, the apparatus further includes:

a third scoring module configured to determine a third score of the question, the third score being a score representing a type to which the question belongs; and the score set of any of the candidate texts further includes: the third score of the question.

In some embodiments, referring to FIG. 5, the apparatus further includes:

a fourth scoring module configured to determine at least one fourth score of each candidate combination respectively, any of the candidate combinations being a combination composed of a candidate text, an article of the candidate text, and the question, each of the fourth scores representing a score of verifying a matching degree between elements in a candidate combination in accordance with a preset checking rule; and the score set of any of the candidate texts further includes: all fourth scores of the candidate combination of the candidate text.

In some embodiments, the answer determining module is configured to:

determine at least a part of the candidate texts as an answer using a preset machine learning model based on the score set of each of the candidate texts.

In a third aspect, some embodiments of the present disclosure provide an electronic device, including:

one or more processors; and a storage apparatus, storing one or more programs, where the one or more programs, when executed by the one or more processors, cause the one or more processors to implement any one of the above methods for obtaining an answer to a question.

In a fourth aspect, some embodiments of the present disclosure provide a computer readable medium, storing a computer program thereon, where the program, when executed by a processor, implements any one of the above methods for obtaining an answer to a question.

Those of ordinary skills in the art can understand that all or some steps of the method, and functional modules/units in the system and apparatus disclosed above may be implemented as software, firmware, hardware, and appropriate combinations thereof. In a hardware embodiment, the division between the functional modules/units mentioned in the above description does not necessarily correspond to division of the physical components. For example, a physical component may have a plurality of functions, or a function or step may be executed by a plurality of physical components cooperatively. Some or all of the physical components of the physical components may be implemented as software executed by a processor, such as a central processor, digital signal processor or microprocessor, or may be implemented as hardware, or may be implemented as an integrated circuit, such as an application-specific integrated circuit. Such software may be distributed on a computer readable medium. The computer readable medium may include a computer storage medium (or a non-transitory medium) and a communication medium (or a transitory medium). As is known to those of ordinary skills in the art, the term "computer storage medium" includes a volatile/non-volatile, removable/non-removable medium implemented in any method or technology for storing information (e.g., computer readable instructions, data structures, program modules, or other data). The computer storage medium includes, but is not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage apparatuses, or any other medium that may be used for storing desired information and may be accessed by a computer. Further, as is known to those of ordinary skills in the art, the communication medium generally contains computer readable instructions, data structures, program modules or other data in modulated data signals such a carrier wave or other transmission mechanisms, and may include any information delivery medium.

Example embodiments have been disclosed herein, and although specific terms are employed, they are used and should be construed as generic and descriptive meanings only, and are not for purpose of limitation. In some instances, it is obvious for those skilled in the art, features, characteristics, and/or elements described in connection with a particular embodiment may be used singly or in combination with features, characteristics, and/or elements described in connection with other embodiments, unless otherwise specifically indicated. Accordingly, those skilled in the art understand that various changes in form and details may be made without departing from the scope of the present disclosure as set forth in the appended claims.

What is claimed is:

1. A method for obtaining an answer to a question, comprising:

acquiring the question;

determining at least a part of articles in a preset article database as candidate articles, and determining first scores of the candidate articles respectively, the first score of any of the candidate articles representing a matching degree between the candidate article and the question;

determining at least a part of texts in each of the candidate articles as candidate texts, and determining second scores of the candidate texts respectively, the second score of any of the candidate texts representing a matching degree between the candidate text and the question;

determining at least one fourth score of each of candidate combinations respectively, any of the candidate combinations being a combination composed of the candidate text, the article of the candidate text, and the question, each of the fourth scores representing a score of verifying a matching degree of between elements in a candidate combination in accordance with a preset checking rule; and determining at least a part of the candidate texts as the answer to the question based on a score set of each of the candidate texts, the score set of any of the candidate texts comprising the second score of the candidate text, the first score of the candidate article to which the candidate text belongs, and all fourth scores of the candidate combination of the candidate text.

2. The method according to claim 1, wherein after the acquiring a question and before the determining at least a part of the candidate texts as the answer, the method further comprises:

determining a third score of the question, the third score being a score representing a type to which the question belongs; and the score set of any of the candidate texts further comprises:

the third score of the question.

3. The method according to claim 1, wherein the determining at least a part of the candidate texts as the answer based on a score set of each of the candidate texts comprises:

determining at least a part of the candidate texts as the answer using a preset machine learning model based on the score set of each of the candidate texts.

4. An apparatus for obtaining an answer to a question, comprising:

at least one processor; and a memory storing instructions, wherein the instructions when executed by the at least one processor, cause the at least one processor to perform operations, the operations comprising:

acquiring the question;

determining at least a part of articles in a preset article database as candidate articles, and determining first scores of the candidate articles respectively, the first score of any of the candidate articles representing a matching degree between the candidate article and the question;

determining at least a part of texts in each of the candidate articles as candidate texts, and determining second scores of the candidate texts respectively, the second score of any of the candidate texts representing a matching degree between the candidate text and the question;

determining at least one fourth score of each of candidate combinations respectively, any of the candidate combinations being a combination composed of the candidate text, the article of the candidate text, and the question, each of the fourth scores representing a score of verifying a matching degree of between elements in a candidate combination in accordance with a preset checking rule; and determining at least a part of the candidate texts as the answer to the question based on a score set of each of the candidate texts, the score set of any of the candidate texts comprising the second score of the candidate text, the first score of the candidate article to which the candidate text belongs, and all fourth scores of the candidate combination of the candidate text.

5. The apparatus according to claim 4, wherein the operations further comprise:

determining a third score of the question, the third score being a score representing a type to which the question belongs; and the score set of any of the candidate texts further comprises: the third score of the question.

6. The apparatus according to claim 4, wherein the determining at least a part of the candidate texts as the answer based on a score set of each of the candidate texts comprises:

determining at least a part of the candidate texts as the answer using a preset machine learning model based on the score set of each of the candidate texts.

7. A non-transitory computer readable medium, storing a computer program, wherein the program, when executed by a processor, causes the processor to perform operations, the operations comprising:

acquiring a question;

determining at least a part of articles in a preset article database as candidate articles, and determining first scores of the candidate articles respectively, the first score of any of the candidate articles representing a matching degree between the candidate article and the question;

determining at least a part of texts in each of the candidate articles as candidate texts, and determining second scores of the candidate texts respectively, the second score of any of the candidate texts representing a matching degree between the candidate text and the question;

determining at least one fourth score of each of candidate combinations respectively, any of the candidate combinations being a combination composed of the candidate text, the article of the candidate text, and the question, each of the fourth scores representing a score of verifying a matching degree of between elements in a candidate combination in accordance with a preset checking rule; and determining at least a part of the candidate texts as an answer to the question based on a score set of each of the candidate texts, the score set of any of the candidate texts comprising the second score of the candidate text, the first score of the candidate article to which the candidate text belongs, and all fourth scores of the candidate combination of the candidate text.

* * * * *